United States Patent Office 3,114,726
Patented Dec. 17, 1963

3,114,726
BROWN COLORANT FOR PLASTICS
Joseph Clyde Conger, Sr., Somerville, N.J., Reginald Clifford Barlow Robinson, Fairfield, Conn., and Shirley Elizabeth Kelly, Somerville, N.J., assignors to American Cyanamid Company, New York, N.Y., a corporation of Maine
No Drawing. Filed Oct. 26, 1960, Ser. No. 65,020
5 Claims. (Cl. 260—38)

This invention relates to a colorant for plastics and to the plastics colored therewith.

More particularly, this invention relates to the provision of a new colorant which is a co-precipitate of an acidic dye, on the one hand, with a combination of at least one basic dye and a diarylguanidine; and to the plastics, especially phenolics, colored therewith.

As is well known in the plastics field, a combination of burnt umber, per se, or burnt umber and oil-soluble red dyes are customarily used for coloring phenolics a desirable red shade of brown. There are numerous problems connected with the use of burnt umber, not the least of which, is lack of standardization of earth pigment with the result that each lot must be standardized by an elaborate procedure.

As an alternative to avoid the expense of frequent standardization, a sizable inventory of uniformly mixed burnt umber must be maintained at the extra expense of carrying this inventory. In addition, burnt umber is low in tinctorial value and is therefore required in an amount up to 17–20% of the plastics mix, with the result that it alters the bulk density and other properties of the plastic. Nevertheless, these natural colorants have been widely used for lack of a more desirable substitute.

It is the object of this invention to provide a brown colorant which overcomes the disadvantages encumbent in the use of natural brown colorants. It is a further object to provide resin compositions containing the colorants of our invention. Other objects will be made apparent hereinafter.

It has now been found that a dye composition particularly suitable for imparting a brown color to plastics (e.g. phenolic plastics) can be obtained by reacting a mono-azo acid dye of the formula:

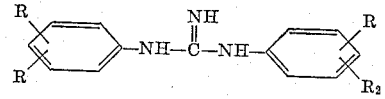

wherein X is a sulfonic acid radical or an alkali metal sulfonate, (e.g. sodium potassium sulfonate), and R is hydrogen or lower alkyl, with (1) at least one basic dye of the triarylmethane or thiazole series represented by the following formulae:

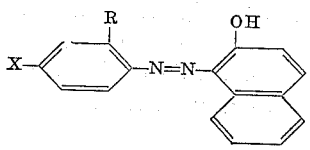

and

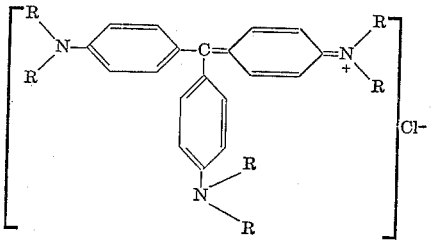

wherein each of the R groups is hydrogen or lower alkyl; and (2) a colorless diaryl guanidine base of the formula:

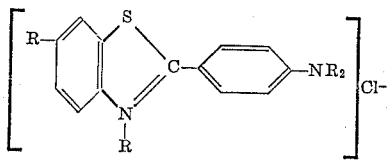

wherein each of the R radicals is as hereinbefore defined.

The co-precipitate of this invention is prepared by separately dissolving the acidic dye, the selected basic dye or dyes and the diarylguanidine in a minimum amount of water. The components may be converted to their simple salt forms, if increased solubility is desired. The co-precipitation reaction is readily conducted at room temperature by merely contacting the aqueous solutions of the acidic and basic components. The order of contact is not critical. The components may be either simultaneously mixed or added to each other consecutively. It is preferred, however, to first mix the acidic and basic dye component and then, to this mixture, add the guanidine component. When all of the components have been combined, and sufficient time has elapsed to allow for substantially complete co-precipitation, the co-precipitate is separated from the reaction mixture, as by filtration, washed with water until essentially free of chloride ions, air dried, and then milled to yield the co-precipitate of this invention in the form of a fine powder.

The proportions of the components necessary for the formation of the co-precipitate of this invention will vary with the individual component employed. It is only necessary that the acidic component i.e., the acid dye, be neutralized by the basic components constituting the co-precipitate. Thus, for the purpose of this invention, an equivalent amount of the acid dye in aqueous solution is mixed with as many parts by weight of the basic components as are necessary to neutralize it, i.e., an equivalent amount of the basic components. The basic dye component should constitute from 8 to 12% of the weight of the acid component. The actual amount of the guanidine will range from about 65% or more, up to about an equal amount of the acid dye on a weight basis. This, of course, may vary somewhat depending on the particular guanidine, the number of sulfonic acid groups on the acid dye and the dilution.

The colorant of this invention will yield a brown colored plastic when used in the order of only 0.1–2% by weight of the molding powder. The great strength of the co-precipitate of this invention as compared to burnt umber, manifests itself in additional ways. Thus it is not necessary to keep on hand large batches of colorant and moreover, since the co-precipitate of this invention is a synthetic substance, it is standardized in its manufacture, whereas, natural burnt umber varies from batch to batch, and each batch must be standardized before use.

The colorant of this invention is applied to plastics by conventional means known to the art. Thus, as one alternative the resin to be colored, e.g., the phenolformaldehyde resin, is blended with the colorant after which the mixture is molded at temperatures up to about 375° F. and pressures up to about 1200 lbs. p.s.i.

The following examples are presented to further illustrate the invention, all parts being expressed as parts by weight, unless otherwise specified:

*Example 1*

Individual aqueous solutions of the following are prepared (the minimum quantity of water necessary to dissolve the components being used):

5.0 parts of 4-(2-hydroxy-1-naphthylazo)-3-methylbenzene sodium sulfonate
0.5 part of pentamethyl-rosaniline chloride 0.5 part of N-methyl-2-(p-N,N-dimethylaminophenyl)-6-methylbenzothiazolium chloride 2.9 parts of N,N'-di-phenyl guanidine hydrochloride The rosaniline solution is added to the benzene sodium sulfonate gradually with moderate stirring, after which the benzothiazolium chloride solution is added. To this mixture is then added the solution of the di-phenyl guanidine hydrochloride. A precipitate forms which is separated from a reaction mixture by filtration, washed to remove essentially all the chloride ions and salts, air dried and then milled to give the desired product as a fine dry powder.

Addition of as little as 0.5 part of this product to a phenol-formaldehyde resin molding powder yields a deep rich red-brown product when the powder is molded.

Substitution of di-orthotholyl-guanidine in the procedure of Example 1 results in a co-precipitate which when applied to a phenol-formaldehyde resin, also gives a brown colored product.

*Example 2*

Each of the following ingredients is separately dissolved in a minimum quantity of water required to give complete solution.

250 g. of 4-(2-hydroxy-1-naphthylazo)-3-methylbenzene sodium sulfonate 25 g. of pentamethyl-rosaniline chloride 197.5 g. of diphenyl-guanidine hydrochloride The rosaniline solution is added to the benzene sodium sulfonate with stirring, and to this mixture is then added the solution of diphenyl-guanidine hydrochloride. The mixture is stirred until precipitation is substantially completed, after which the precipitate is filtered, washed with water until essentially free of chloride ions and salts, air dried and milled to give the product as a fine powder.

0.5 gram of the product of Example 2 is mixed with 100 grams of phenol-formaldehyde molding powder. The mixture is heated under pressure in a conventional molding machine, thereby yielding a product which is of deep brown color.

Similar results are obtained if di-ortho-ethylphenyl guanidine is substituted for the diphenyl guanidine; similar results are also obtained if an isomeric mixture of di-xylyl guanidine is used instead.

What is claimed is:

1. As a brown colorant, a neutral co-precipitate of an acidic dye of the formula:

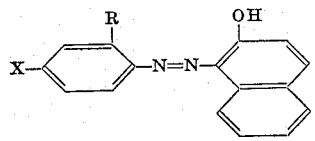

with (1) at least one basic dye selected from the group consisting of those having the following formulae:

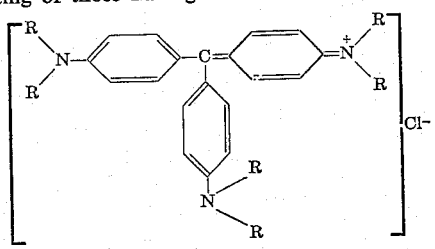

and

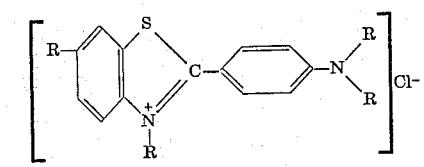

and (2) a diaryl guanidine of the formula:

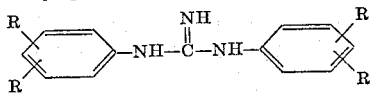

wherein X is a member selected from the group consisting of a sulfonic acid and an alkali metal sulfonate radical and each of the R radicals is a member selected from the group consisting of hydrogen and lower alkyl.

2. The composition of claim 1 wherein the basic dye is present in an amount of about 8–12% by weight of the acidic dye component.

3. The composition of claim 2 wherein the acidic dye is neutralized with a combination of di-phenyl guanidine, N-methyl-2-(p-N,N-dimethylaminophenyl) - 6 - methyl-benzothiazolium chloride and pentamethyl-rosaniline chloride.

4. A phenol-formaldehyde resin containing from about 0.1 to 2.0% of the colorant of claim 1.

5. A phenol-formaldehyde resin containing from about 0.1 to 2.0% of the colorant of claim 3.

References Cited in the file of this patent

UNITED STATES PATENTS

| | | |
|---|---|---|
| 2,492,163 | Locke | Dec. 27, 1949 |
| 2,966,417 | Anderson | Dec. 27, 1960 |
| 2,966,418 | Anderson | Dec. 27, 1960 |
| 2,981,741 | Buckwalter et al. | Apr. 25, 1961 |

FOREIGN PATENTS

| | | |
|---|---|---|
| 469,179 | Germany | Dec. 4, 1928 |